United States Patent [19]

Tesvich et al.

[11] Patent Number: 5,773,064

[45] Date of Patent: *Jun. 30, 1998

[54] HEAT TREATMENT OF RAW MOLLUSCAN SHELLFISH INCLUDING A BANDING PROCESS

[76] Inventors: John Tesvich, Rte. 1 Box 459-E, Buras, La. 70041; John Schegan, 12110 E. Slauson, Ste. 15, Santa Fe Springs, Calif. 90670; Patrick Fahey, 1200 Harmony St., New Orleans, La. 90015

[ * ] Notice: The term of this patent shall not extend beyond the expiration date of Pat. No. 5,679,392.

[21] Appl. No.: 620,155

[22] Filed: Mar. 22, 1996

[51] Int. Cl.$^6$ .......................... A23B 4/005; A22C 29/04
[52] U.S. Cl. ...................... 426/420; 426/521; 426/383; 426/132; 426/643
[58] Field of Search .................................. 426/129, 412, 426/643, 132, 420, 521, 383

[56] References Cited

U.S. PATENT DOCUMENTS

| | | | |
|---|---|---|---|
| 568,482 | 9/1896 | Hirst . | |
| 2,842,443 | 7/1958 | Rice et al. | 426/132 |
| 3,331,105 | 7/1967 | Gordon | 426/132 |
| 3,418,138 | 12/1968 | Dennis et al. . | |
| 3,436,231 | 4/1969 | Bruce et al. | 426/132 |
| 3,615,726 | 10/1971 | McMillan | 426/241 |
| 3,641,982 | 2/1972 | Woodridge et al. | 119/4 |
| 3,658,559 | 4/1972 | Mohwinkel | 426/412 |
| 4,164,590 | 8/1979 | Mencacci | 426/412 |
| 4,537,149 | 8/1985 | Ryan | 119/4 |
| 4,659,574 | 4/1987 | Carlsson et al. | 426/68 |
| 5,186,121 | 2/1993 | Smith, Jr. | 119/4 |
| 5,281,426 | 1/1994 | Pardo | 426/412 |

FOREIGN PATENT DOCUMENTS

| | | | |
|---|---|---|---|
| 1100353 | 5/1981 | Canada | 426/412 |
| 242183 | 10/1987 | European Pat. Off. | 426/412 |
| 59/132852 | 7/1984 | Japan . | |
| 60/49770 | 3/1985 | Japan | 426/129 |
| 2/177851 | 7/1990 | Japan . | |

OTHER PUBLICATIONS

J. of Food Protection vol. 55, Dec. 1992, pp. 985–989.
J. of Food Sci. 56(5), 1991 pp. 1292–1294 (Dialog Abstract) & Full Text.
J. Food Sci. 49(2), 1984 pp. 331–333 (Dialog Abstract) & Full Text.
J. Food Sci. 53(2), 1988 pp. 325–327, 348 (Dialog Abstract) & Full Text.
Commerce News, Nat'l Oceanic & Atm. Admin. 1979, Sen 85 4 pp. (Dialog Abstract).
Food Engineering Nov. 1979, p. 176 (Dialog Abstract) & Full Text.
J. of Food Science 55(2) pp. 372, 373, 429, 1990 (Dialog Abstract).
Alimentos, 1–2/1994 v.19(1) 5–17 (Dialog Abstract).
Southeast Asian Fisheries Development Center 1985 p. 26 (Dialog Abstract).

(List continued on next page.)

*Primary Examiner*—Steven Weinstein
*Attorney, Agent, or Firm*—Tom Hamill, Jr.

[57] ABSTRACT

A method of preparing raw molluscan shellfish meat in the shell is disclosed which employs a mild heat treatment and cold storage for the destruction or reduction to lower levels of harmful pathogenic bacteria such as Vibrio vulnificus, Vibrio cholerae and others. The raw molluscan shellfish, such as oysters, arrives at the processing plant in a refrigerated state. The mollusks then have a band placed around them, securing them against opening. The banded mollusks are then placed in a fluid bath at a sufficient temperature and duration to kill pathogens yet leave the meat in a raw state. The mollusks are then conveyed from the heated fluid bath and placed in a cold fluid bath. The mollusks are then removed from the cold fluid bath. The natural enclosure of the mechanically banded mollusk prevents the hot or cold fluids from contacting the flesh of the mollusk. The mollusks remain in a raw state and in the shell throughout the process. The pathogenic bacteria are reduced through the action of this process. Also disclosed is a banded mollusk product, suitable for human consumption with minimal preparation.

3 Claims, 2 Drawing Sheets

OTHER PUBLICATIONS

J. of Food Protection, 1986, 49(11) pp. 877–879 (Dialog Abstract).

Developments in Industrial Microbiology 1983, 24, pp. 457–465 (Dialog Abstract) & Full Text.

Food Industries of S. Africa 1979, Nov., 31 (Dialog Abstract) & Full Text.

Paper, Film & Foil Converter 1990, 64(6) pp. 142–144 (Dialog Abstract).

Report of Toyo Junior College of Food Technology & Toyo Institute of Food Technology 1974, No. 11, 73–79 (Dialog Abstract).

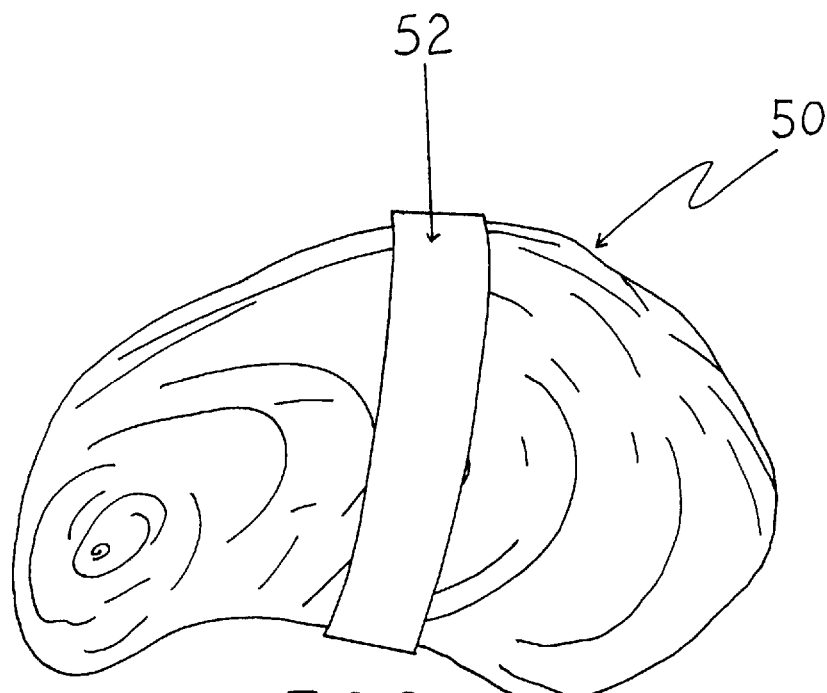
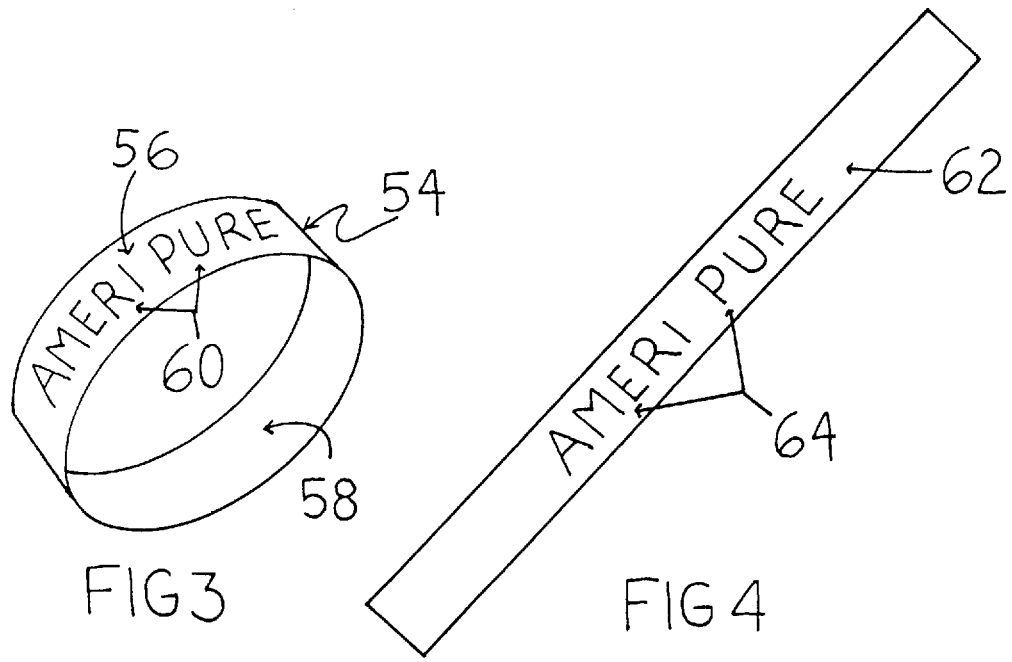

HEAT TREATMENT OF RAW MOLLUSCAN SHELLFISH INCLUDING A BANDING PROCESS

BACKGROUND OF THE INVENTION

1. Field of the Invention

The present invention relates generally to heat treatment of raw molluscan shellfish, and more particularly, to a heat treatment and cold storage process to be employed with such mollusks, such as oysters, (Genus: Ostrea) especially adapted to effect reduction of harmful bacteria, including *Vibrio cholerae*, Vibrio vulnificus and *Vibrio parahaemolyticus*. This process may be effective against a variety of other pathogenic producing bacteria and as such would be extremely useful in the shellfish industry. This process will place a band about the shellfish in order to prevent the shell from opening during the mild heat treatment described herein, as well as throughout its transport to the end user.

2. Description of the Prior Art

While seafood are generally considered healthy and safe to consume, concerns about the safety of eating raw molluscan shellfish such as oysters are widespread. Bacteria, such as the autochthonous estuarine bacterium Vibrio vulnificus, the deadly *Vibrio cholerae* and *Vibrio parahaemolyticus* may be transferred from the marine environment to the molluscan shellfish. These bacteria have been shown to cause primary septicemia, gastroenteritis, diarrhea, nausea, vomiting, tenesmus, fever, dehydration and death in humans. Septicemia generally leads to secondary cutaneous lesions and necrotic ulcers of the extremities, and approximately sixty percent of all known cases result in fatalities. Other bacteria may also be pathogenic and may be introduced to the human through consumption of raw molluscan shellfish meat. The Vibrio bacterium is located in oysters and as such raises public health concerns. This method will be utilized to reduce these and other pathogenic organisms to permit the harvesting of oysters during the warmer months and in warmer waters, especially in the southern United States, where it has been proposed by the Food and Drug Administration to suspend the harvesting of oysters during the summer months as a health precaution. It is also noted that these disease causing bacteria are endemic in Asia and the Pacific.

The consumption of raw molluscan shellfish meat is widespread, and it is desirable to permit its continued consumption without endangering the health of the consumer. No current commercial methods employed permit the mollusk to be heat treated and remain in the raw, uncooked state. Very few effective means of treating oysters meant for raw consumption currently exists.

Some methods for the preservation and sterilization of crustacean shellfish are known in the art, but these are directed to the canning of the product as well as to increasing the products shelf life in a commercial market. For example, U.S. Pat. No. 5,268,189 issued to Doerter discloses a process which employs a thermally conductive mixture which forms a liquid barrier upon heating and a gel upon cooling. The process is utilized in the packaging of crustacean shellfish (crabs, lobsters, crawfish, shrimp) in container for packaging, and further placement on a shelf at a distribution point. The method employs specific heating and cooling steps which are of high temperature and long duration which destroys harmful bacteria during the packaging (canning) of the crustacean meat. The invention seems to be concerned primarily with shrimp, crabs, and lobster and spoilage bacteria associated with the canning of those items.

Other methods lend themselves to the securing of the shellfish shell itself. U.S. Pat. No. 568,482 issued to Hirst shows a pin securing the two halves of an oyster shell together near the point furthest from the hinge of the shell in order to preserve the oyster's liquor. The pin is placed in the shell after the shell has been perforated. Hirst does not teach or disclose a band or a heat treatment process.

Thus, while the foregoing prior art indicates it to be well known to use heating and cooling to destroy unwelcome microorganisms during packaging, to increase shelf life, the temperatures employed are sufficiently high and of sufficient duration to actually cook the meat. The provision of a simple and cost effective method to safely destroy the harmful pathogenic bacteria through the use of mild heat treatment and cool storage which leaves the mollusk (oyster, clam, other mollusks) meat in a raw state is not contemplated. Nor does the prior art described above appear to teach or suggest a method which treats the raw molluscan shellfish in the shell. The final product brought to the consumer will still be in its shell. This is desirable, as a favorite consumer food is a mollusk on the halfshell. This process will permit the consumer to still consume his mollusk on the halfshell, in a raw state, with the harmful bacteria destroyed through the novel process of the instant invention. No prior art appears to teach the placement of a band about the mollusk to secure the shell halves in a closed position. This novel means for securing shellfish has many advantages. Other advantages of the present invention over the prior art also will be rendered evident.

SUMMARY OF THE INVENTION

To achieve the foregoing and other advantages, the present invention, briefly described, provides a method of preparing raw molluscan shellfish meat in the shell which employs a mild heat treatment and cold storage for the reduction to lower levels of harmful pathogenic bacteria such as enumerated above. The raw molluscan shellfish, including, but not limited to oysters, arrives at the processing plant in a refrigerated state. The product is then culled, cleaned and graded into categories according the product size. The product is then banded across its perimeter using synthetic rubber, plastic or metal banding elements to keep the mollusk shut. This banding process may be performed by an automatic banding machine. The banded product is then placed on a rack, or other conveyance, which is then lowered into a circulating bath of water at a sufficient temperature and duration to kill the pathogens yet leave the meat in a raw state. The rack may be conveyed through a multi-temperature heat treatment vessel which would treat the mollusks for different durations at different preferred temperatures. The rack is then removed from the heated water bath and placed in a cold water bath with a continuous flow for a time period. The rack is removed from the cold water bath. The still banded product is then packed for storage and transport. The packed product is placed in refrigerated storage until shipped to the customer in a refrigerated transport.

It is to be understood that other equivalent heating methods have been contemplated to reduce the bacteria located in the mollusks and may be employed in this process. These include, but are not limited to, convection heating in an oven, steam heating and microwave heating. In the same manner, other equivalent cooling methods have been contemplated as well. These include, but are not limited to, ice, refrigerated air, and other known conventional cooling means.

The mollusk remains in a raw state and in-shell throughout the process. The pathogenic bacteria may be reduced to an undetectable level by this process. This process retains the natural flavor of the molluscan meat, as well as the raw state and texture associated with "raw bar" style mollusk prepared for consumption.

To serve the mollusk one removes the band and removes the shell per the known "raw bar" style mollusk preparation method. The above description is merely indicative of one possible embodiment of a heat treatment method possible utilizing the banded mollusks.

The terms mollusk and raw molluscan shellfish are utilized to primarily cover the class of marine organisms located within a shell. This includes bivalves, oysters, clams, as well as other such organisms.

A shellfish product where the mollusk is banded is also disclosed. Irrelevant of centralized heat treatment, such a product may be sold to consumers. The band may include advertising indicia. The final step prior to consumption would be removal of the securing band.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will form the subject matter of the claims appended hereto.

In this respect, before explaining at least the preferred embodiments of the invention in detail, it is to be understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which this disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a process for the preparation of raw molluscan shellfish which reduces harmful pathogenic bacteria, such as *Vibrio cholerae, Vibrio vulnificus*, and *Vibrio parahaemolyticus* to undetectable levels, and lower total bacteria plate counts.

It is therefore an object of the present invention to provide a process for the preparation of raw molluscan shellfish which provides a mild heat treatment and the cold storage of the mollusk.

It is therefore an object of the present invention to provide a process for the preparation of raw molluscan shellfish which takes place with the mollusk remaining in the shell throughout the process, permitting harmful bacteria and other organisms to be destroyed while bringing the product to the consumer in shell.

It is therefore an object of the present invention to provide a process for the preparation of raw molluscan shellfish which brings the mollusk to the consumer in a raw, uncooked state, which permits the mollusk to be prepared on the halfshell.

It is therefore an object of the present invention to provide a process for the preparation of raw molluscan shellfish in the shell which includes a band secured about the mollusk for the purpose of preventing the opening of the mollusk during heat treatment, thereby preventing contamination and product degradation.

It is therefore an object of the present invention to provide a process for the preparation of raw molluscan shellfish which may be easily and efficiently performed.

An even further object of the present invention is to provide a new and improved process for the preparation of raw molluscan shellfish which is susceptible to a low processing cost with regard to both materials and labor, and which accordingly is then susceptible to placing the processed product at a low price of sale to the consuming public, thereby making such a mollusk product available to the buying public.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawings wherein:

FIG. 2 is a top view showing a oyster which has been banded.

FIG. 3 is a view of an elastic band member which will be placed around the mollusk.

FIG. 4 is a view of a wrap around band member.

DESCRIPTION OF THE PREFERRED EMBODIMENT

Figure 1:
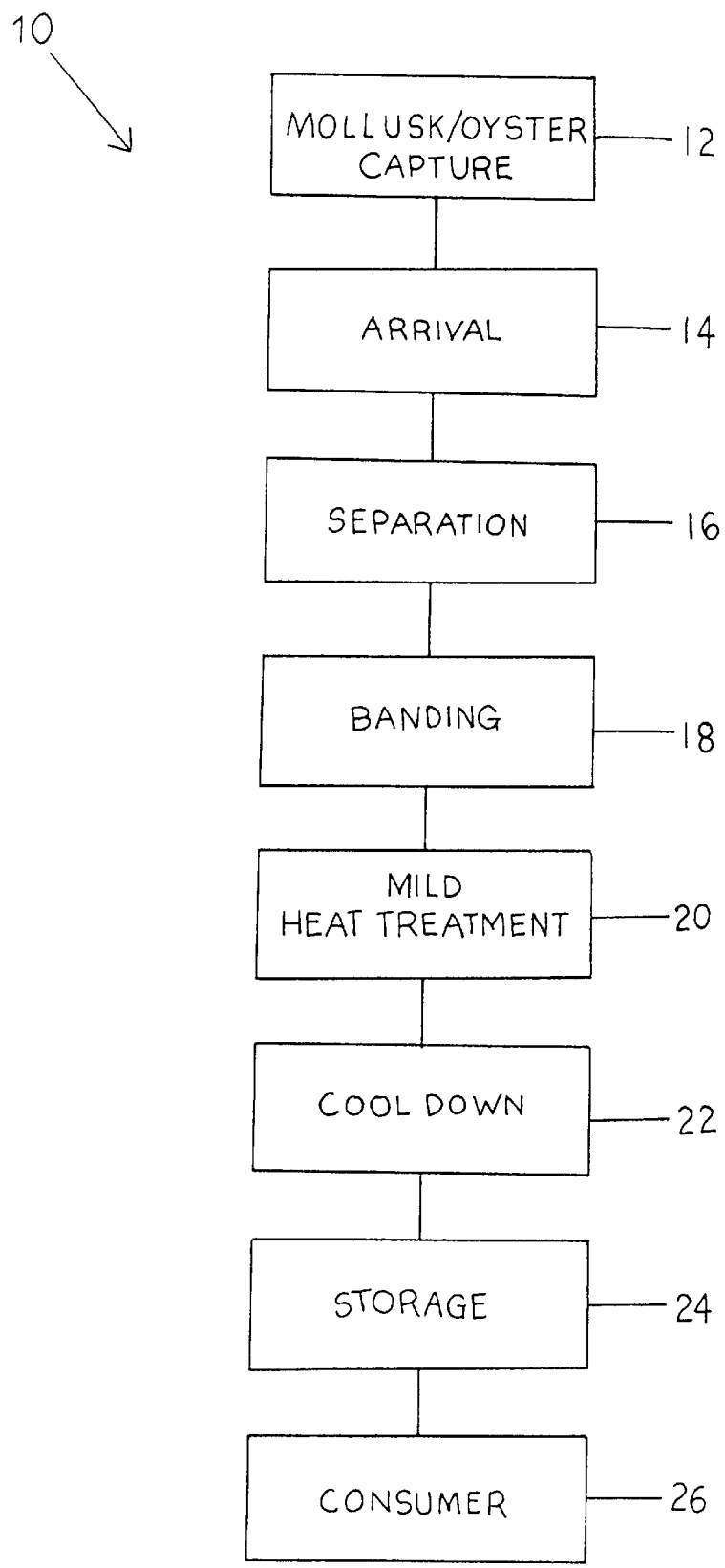
FIG. 1 is a block diagram in flowchart form showing the various steps of the process for the preparation of raw molluscan shellfish which would reduce the pathogenic bacteria.

With reference now to the drawings, a new and improved process for the preparation of raw molluscan shellfish embodying the principles and concepts of the present invention will be described.

Turning initially to FIG. 1, there is shown a first exemplary embodiment of the process for the preparation of raw molluscan shellfish of the invention generally designated by reference numeral 10. In its preferred form, the raw molluscan preparation process 10 comprises generally several steps. The first step will be the capture step 12. The molluscan shellfish will be captured in their indigenous environment by traditional mollusk harvesting techniques. These mollusk live with the autochthonous estuarine bacterium *Vibrio vulnificus*, as well as other pathogenic bacterium, including *Vibrio cholerae*. It is not possible to determine from the outward appearance of the mollusk whether or not it is contaminated with any of the harmful bacterium; hence it may be appropriate to treat all harvested mollusks.

The mollusk are then transported by conventional means to the processing plant. The first step will be the arrival step 14. During this step the mollusk arrives at the processing plant. The mollusk are immediately placed in a refrigerated state, optimally between the temperatures of 34 to 40 degrees fahrenheit. This maintains the mollusk in a living state, above freezing, with minimal degradation.

The second step will be the separation step 16. During the separation step, the mollusk is culled, removing large external debris. The mollusk is also cleaned during the separation step, removing mud, dirt and other fine debris from the mollusk. This may be accomplished by a variety of means including water spray. The debris, dirt and mud will be disposed of, with the used water by any suitable conventional method. During the separation step 14 the product is also separated into grades according to size, and then placed on conveyors feeding to the banding machines.

The third step is the banding step 18. In order to keep the mollusk in a closed state during the upcoming heat treatment, the mollusk is banded about its perimeter using synthetic rubber, plastic or metal bands during the banding step 18. The banding will be accomplished by automatic banding machines which are commercially available. It is to be understood that modifications may be made to the banding machines to accommodate the unique shapes of the molluscan shellfish. The banding material may be elastic, a heat shrinkable material or any other known banding material. The band will be chosen in order to supply sufficient binding force to keep the mollusk's shell closed during the entire heat treatment, processing, and packaging stages. Another factor in the choice of banding material will be general strength. Mollusk edges are sharp and the banding material must be resistant to tearing or loosening by the action of other similarly banding mollusks. The band may also be designed to be "tamper-evident". The band about the mollusk will not interfere with thermal conductivity during the upcoming mild heat treatment 20 and cool down steps 22. The banded mollusks are transported to the mild heat treatment step 20. This transport may be a conveyer or other equivalent means.

The fourth step in the process is the mild heat treatment step 20. The banded mollusks may be placed on a rack or other suitable device. Whether on a rack or otherwise, the mollusks are placed in the heat treatment container. Within the container is fluid, preferably a circulating bath of purified water with other trace components. The temperature of the fluid bath is preferably between about 110–140 degrees fahrenheit. The mild heat treatment process step may last between 10 to 120 minutes depending on the grade size being treated as well as the temperature of the warm fluid bath selected. A marginally cooler or hotter fluid bath may be employed with an appropriately adjusted time period. The increased/decreased possible range of the fluid bath is (±) 10 degrees fahrenheit. The temperature of the fluid bath and immersion time period is selected as to not cook the mollusk. Therefore, the mollusk remains in a raw state. Due to the fact that the mollusk is banded, it remains closed in the fluid bath which prevents contamination of the mollusk as well as retains its natural fluids or liquor. This has the added effect of treating the mollusk in their own natural liquor.

The fifth step in the process is the cool down step 22. The racks, if employed, are removed from the hot fluid bath and the product is then placed in a cold fluid bath. The cold fluid bath will cool the mollusks to less than about 45 degrees fahrenheit during the cool down step and the temperature may be selected to be any temperature desired below 45 degrees fahrenheit for optimum results. The cold fluid bath is preferably between the temperatures of about 28–36 degrees fahrenheit and is preferably of a continuous flow variety, that is, the fluid continuously flows about the product due to the action of an impeller or pump. This temperature range is preferred, but those skilled in the art will recognize that other temperatures (either higher or lower) will also serve to cool the mollusks. The banded mollusks are cooled in the cool water for about 15 to 20 minutes depending on which grade (size and weight) of product is being treated, The cooling time may be increased or decreased, depending on the temperature of the cooling bath.

The sixth step in the process is the storage step 24. During this step the individual mollusks (e.g. oysters) may be placed into master cases in specified numbers as required and are then placed under refrigeration. The refrigeration is preferably between 32–40 degrees fahrenheit until shipped to the consumer in refrigerated transport. This temperature, of course, may also be varied to meet different conditions.

The seventh and final step of the process is the consumer step 26. During this step, the consumer enjoys a raw molluscan shellfish which retains its natural flavor and raw texture.

It is apparent from the above that the present invention accomplishes all of the objectives set forth by providing a new and improved process for the preparation of raw molluscan shellfish which reduces harmful pathogenic bacteria, such as the pathogenic Vibrio bacteria heretofore described, preferably to undetectable levels. The process provides a mild heat treatment and the cold storage of the mollusk and which takes place with the mollusk remaining in its natural raw state throughout the process. This allows reduction of harmful bacteria while bringing the product to the consumer in shell, in a raw, uncooked state, which permits the mollusk to be prepared on the halfshell, or by other known preparation methods.

By employing the aforementioned process, one reduces or even destroys the harmful bacteria, yet leaves the mollusk in a raw state, still in the shell, which is viable for commercial consumption.

Referring now specifically to FIG. 2, an oyster 50 is shown with a band 52 secured about the two halves of its shell. An oyster 50 is a representative mollusk. Nevertheless, this process and product may be formed and utilized with any mollusk. The band 52 may be elastic, plastic, metal, heat shrinkable material, or any other suitable material, and may be applied about the mollusk by a conventional banding machine. An elastic or rubber band appears to be more adaptable for the instant process, as such a band can accommodate the variation in mollusk size most efficiently. The band must be chosen in order to exert sufficient force to keep the mollusk completely closed during the mild heat treatment process.

The band may be designed to be "tamper-evident".

Referring specifically now to FIG. 3, an elastic band member 54 is shown. Band member 54 has an outer side 56 and an inner side 58. The outer side 56 is designed to receive indicia 60. This indicia 60 may reflect the processing plant where the mollusks are heat treated or may reflect other advertising, logos, etc.

FIG. 4 shows another band configuration. Band 62 is a plastic band which may be heat welded about the oyster. This band 62 may also receive indicia 64. It is to be understood that any of a variety of bands may be employed. A heat shrink band, twist tie style band and metal bands are but a few of the possible bands which may be employed in the invention.

With respect to the above description, it should be realized that the optimum dimensional relationships for the parts of the invention, to include variations in size, materials, shape, form, function and manner of operation, assembly and use, are deemed readily apparent and obvious to those skilled in the art, and therefore, all relationships equivalent to those illustrated in the drawings and described in the specification are intended to be encompassed only by the scope of appended claims.

While the present invention has been shown in the drawings and fully described above with particularity and detail in connection with what is presently deemed to be the most practical and preferred embodiment of the invention, it will be apparent to those of ordinary skill in the art that many modifications thereof may be made without departing from the principles and concepts set forth herein. Hence, the proper scope of the present invention should be determined only by the broadest interpretation of the appended claims so as to encompass all such modifications and equivalents.

What is claimed as being new and desired to be protected by Letters Patent of the United States is as follows:

1. A process for the treatment of unshucked, raw molluscan shellfish where the shellfish remain in their natural shell throughout the process, including the steps of:
   a) banding the unshucked raw molluscan shellfish by placing a band about the perimeter of their shell,
   b) heat treating the banded, raw molluscan shellfish by placing the banded shellfish in a fluid bath at a temperature of about 110 to 140 degrees Fahrenheit (43.33 to 60 degrees Centigrade) for 10 to 45 minutes, said heat treating being at a temperature and for a time sufficient to destroy harmful pathogenic bacteria including vibrio vulnificus, yet leave the shellfish in a raw state,
   d) cooling the heat treated, banded, unshucked, raw molluscan shellfish by placing the banded shellfish in a fluid bath at a temperature of about 28–45 degrees Fahrenheit for 15 to 20 minutes, said band maintaining said unshucked raw molluscan shellfish closed during said heat treating and cooling steps sufficient to prevent contamination of the unshucked raw molluscan shellfish and to retain its natural fluids,
   e) removing said band from about the shell of the cooled, unshucked, raw molluscan shellfish,
   e) shucking the cooled, raw molluscan shellfish, and
   f) serving the shucked, cooled, raw molluscan shellfish on the half shell.

2. A process as claimed in claim 1 wherein said band is selected from the group consisting of metal bands, elastic bands and plastic heat shrink bands.

3. A process as claimed in claim 1 wherein said band has a first surface, said first surface including indicia.

\* \* \* \* \*